(12) United States Patent
Paramasivam et al.

(10) Patent No.: US 10,686,539 B2
(45) Date of Patent: Jun. 16, 2020

(54) FLEXIBLE DEBUG OBSERVATION POINT INSERTION IN PIPELINE DESIGNS

(71) Applicant: BROADCOM CORPORATION, Irvine, CA (US)

(72) Inventors: Sankar Ganesh Paramasivam, Fremont, CA (US); Abhay Kumar Kulkarni, Milpitas, CA (US)

(73) Assignee: AVAGO TECHNOLOGIES INTERNATIONAL SALES PTE. LIMITED, Singapore (SG)

( * ) Notice: Subject to any disclaimer, the term of this patent is extended or adjusted under 35 U.S.C. 154(b) by 472 days.

(21) Appl. No.: 14/795,855

(22) Filed: Jul. 9, 2015

(65) Prior Publication Data

US 2016/0352440 A1    Dec. 1, 2016

Related U.S. Application Data

(60) Provisional application No. 62/168,693, filed on May 29, 2015.

(51) Int. Cl.
| | |
|---|---|
| *H04B 17/15* | (2015.01) |
| *H04B 17/29* | (2015.01) |
| *G06F 11/36* | (2006.01) |
| *G06F 11/22* | (2006.01) |

(52) U.S. Cl.
CPC ............ *H04B 17/15* (2015.01); *G06F 11/22* (2013.01); *G06F 11/3648* (2013.01); *H04B 17/29* (2015.01)

(58) Field of Classification Search
None
See application file for complete search history.

(56) References Cited

U.S. PATENT DOCUMENTS

| | | | | |
|---|---|---|---|---|
| 5,860,128 A * | 1/1999 | Murdoch | ............. | G11C 7/1024 711/105 |
| 5,915,083 A * | 6/1999 | Ponte | ............... | G01R 31/31705 714/30 |
| 5,991,902 A * | 11/1999 | Yoshida | ................. | G11C 29/70 711/113 |
| 5,996,059 A * | 11/1999 | Porten | ................... | G06F 9/3867 712/200 |
| 6,202,172 B1 * | 3/2001 | Ponte | ............... | G01R 31/31705 712/227 |
| 2006/0039374 A1 * | 2/2006 | Belz | .................... | H04L 12/5693 370/389 |
| 2006/0129718 A1 * | 6/2006 | Stromqvist | ........... | G06F 9/3879 710/57 |
| 2006/0259826 A1 * | 11/2006 | Swoboda | ............ | G06F 11/3648 714/38.13 |

(Continued)

*Primary Examiner* — Gregory B Sefcheck
*Assistant Examiner* — Suk Jin Kang
(74) *Attorney, Agent, or Firm* — Morgan, Lewis & Bockius LLP

(57) ABSTRACT

An apparatus with flexible debug observation-points (DOPs) includes a pipeline that includes multiple stages. A number of DOPs is embedded in the stages, and a DOP memory is provided at an end of the pipeline. The DOP memory is configured to store data associated with each DOP. Each DOP includes a flop-based storage and is identifiable by a unique DOP-identification (ID) associated with that DOP. The DOPs allow shifting data through the DOPs to the DOP memory.

18 Claims, 12 Drawing Sheets

(56) References Cited

U.S. PATENT DOCUMENTS

| | | | | |
|---|---|---|---|---|
| 2009/0089547 A1* | 4/2009 | Moyer | | G06F 11/36 |
| | | | | 712/205 |
| 2010/0162212 A1* | 6/2010 | Stall | | G06F 11/3664 |
| | | | | 717/124 |
| 2010/0332909 A1* | 12/2010 | Larson | | G06F 11/3476 |
| | | | | 714/40 |
| 2011/0161534 A1* | 6/2011 | Brandstaetter | | H04B 1/38 |
| | | | | 710/104 |
| 2012/0146658 A1* | 6/2012 | Rentschler | | G06F 11/3632 |
| | | | | 324/537 |
| 2012/0150474 A1* | 6/2012 | Rentschler | | G01R 31/31705 |
| | | | | 702/117 |
| 2012/0303921 A1* | 11/2012 | Kessels | | G06F 13/1642 |
| | | | | 711/167 |
| 2013/0046962 A1* | 2/2013 | Koesler | | G06F 11/267 |
| | | | | 712/227 |
| 2014/0053036 A1* | 2/2014 | Nixon | | G01R 31/31705 |
| | | | | 714/734 |
| 2014/0173342 A1* | 6/2014 | Kaushikkar | | G06F 11/273 |
| | | | | 714/30 |
| 2014/0281735 A1* | 9/2014 | Olivarez | | G06F 11/2242 |
| | | | | 714/40 |
| 2015/0082092 A1* | 3/2015 | Sarangi | | G06F 11/27 |
| | | | | 714/30 |
| 2015/0082093 A1* | 3/2015 | Sarangi | | G06F 11/27 |
| | | | | 714/30 |
| 2015/0139249 A1* | 5/2015 | Suzuki | | H04L 69/04 |
| | | | | 370/474 |
| 2015/0301915 A1* | 10/2015 | Bhatia | | G06F 11/273 |
| | | | | 714/30 |
| 2016/0314053 A1* | 10/2016 | Bhatia | | G06F 11/273 |
| 2017/0024217 A1* | 1/2017 | Koesler | | G06F 11/267 |
| 2017/0269157 A1* | 9/2017 | Mao | | G06F 11/2236 |
| 2018/0129506 A1* | 5/2018 | Hughes | | G06F 9/3861 |

\* cited by examiner

FLEXIBLE DEBUG OBSERVATION POINT INSERTION IN PIPELINE DESIGNS

CROSS-REFERENCE TO RELATED APPLICATIONS

This application claims the benefit of priority under 35 U.S.C. § 119 from U.S. Provisional Patent Application 62/168,693 filed May 29, 2015, which is incorporated herein by reference in its entirety.

TECHNICAL FIELD

The subject technology generally relates to network devices and, in particular, relates to flexible debug observation point insertion in pipeline designs.

BACKGROUND

Communication devices such as network switches process input packets received via ingress ports in one or more pipelines each including a number of stages. Debugging of the process is performed through debug observation-points (DOPs) set as registers and/or tables in the required areas in the pipeline. The current approach of using DOPs has a number of shortcomings. For example, the register-specification (spec) has to be constantly modified and modifications are to be exposed to test and/or software (SW) teams. Test efforts may be intensive to verify functionality of each DOP as a unique instance by itself. As DOPs are usually added to the pipeline at a last stage of the design, extensive verification may not be possible. In some situations, exposure model to SW can be cumbersome and vague. The current approach is not scalable, and if lots of DOPs are added in a critical-stage, one may run out of the register-addressing space. Finally, it is not easy to add or remove DOPs without additional churn in register-spec and/or testing efforts.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and can be practiced using one or more implementations. In one or more instances, well-known structures and components are shown in block diagram form in order to avoid obscuring the concepts of the subject technology.

In one or more aspects of the subject technology, methods and configurations are described for flexibly adding debug observation-points (DOPs) in a pipeline design. The subject technology is self-contained and provides a rich debugging capability without register-spec changes when DOPs are added and/or removed. In general, the DOPs can provide insight into hardware of a network device such as a network switch. The subject technology facilitates obtaining and debugging information, for example, information regarding the fate of an individual packet received by the network switch and the way that packet is treated in a pipeline, without disrupting the operation of the network switch. The DOPs of the subject technology are flexible and, for example, can be modified at any stage of the project without much disruption. The disclosed solution is scalable and simplifies the design and testing efforts, for example, by using a standard software (SW) exposure model. The subject scheme is SW friendly and includes self-triggering mechanisms and automated DOP-data collection and presentation to SW modules.

Figure 1A:
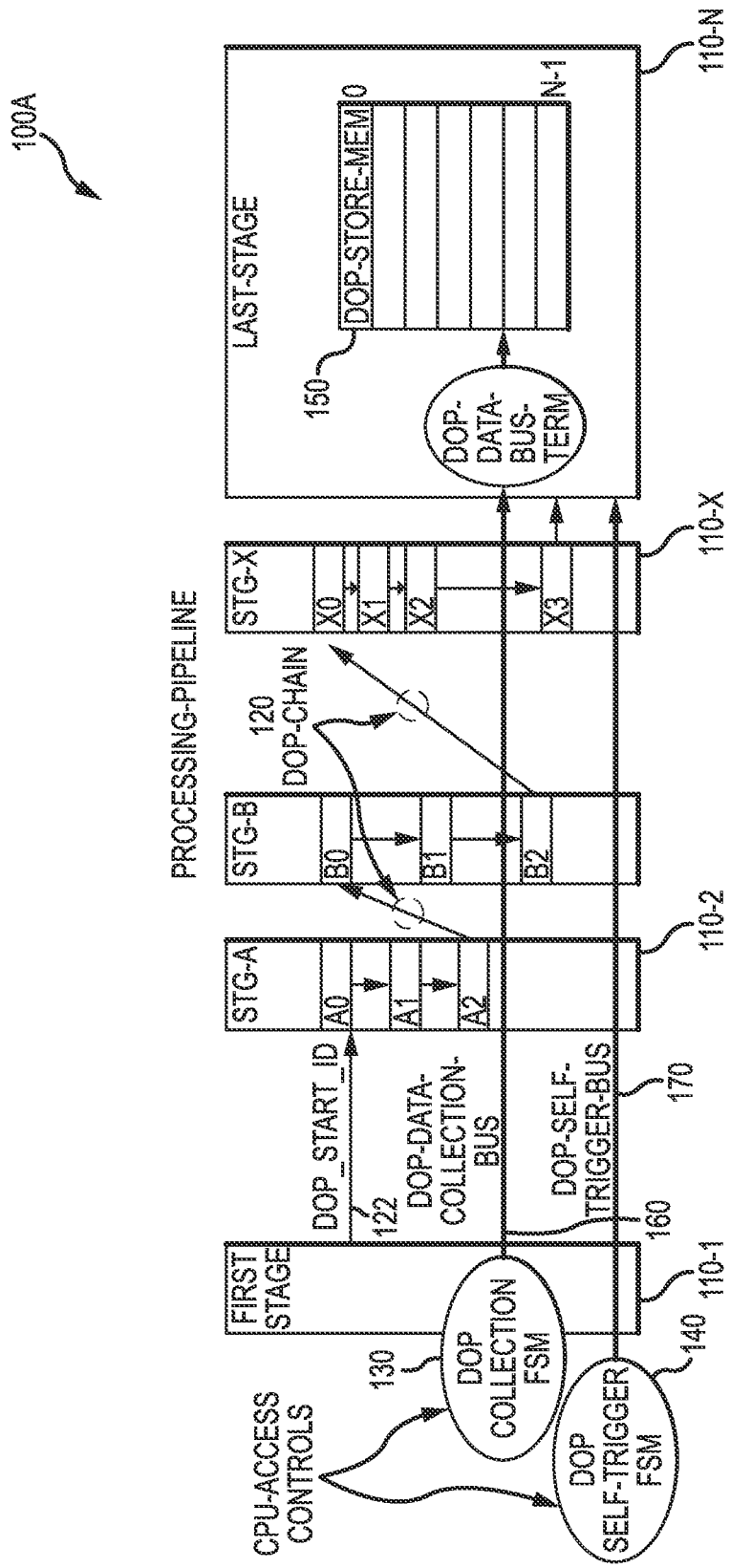
FIGS. 1A through 1C illustrate examples of an apparatus with flexible debug observation-points (DOPs) in accordance with one or more implementations.
Figure 1B:
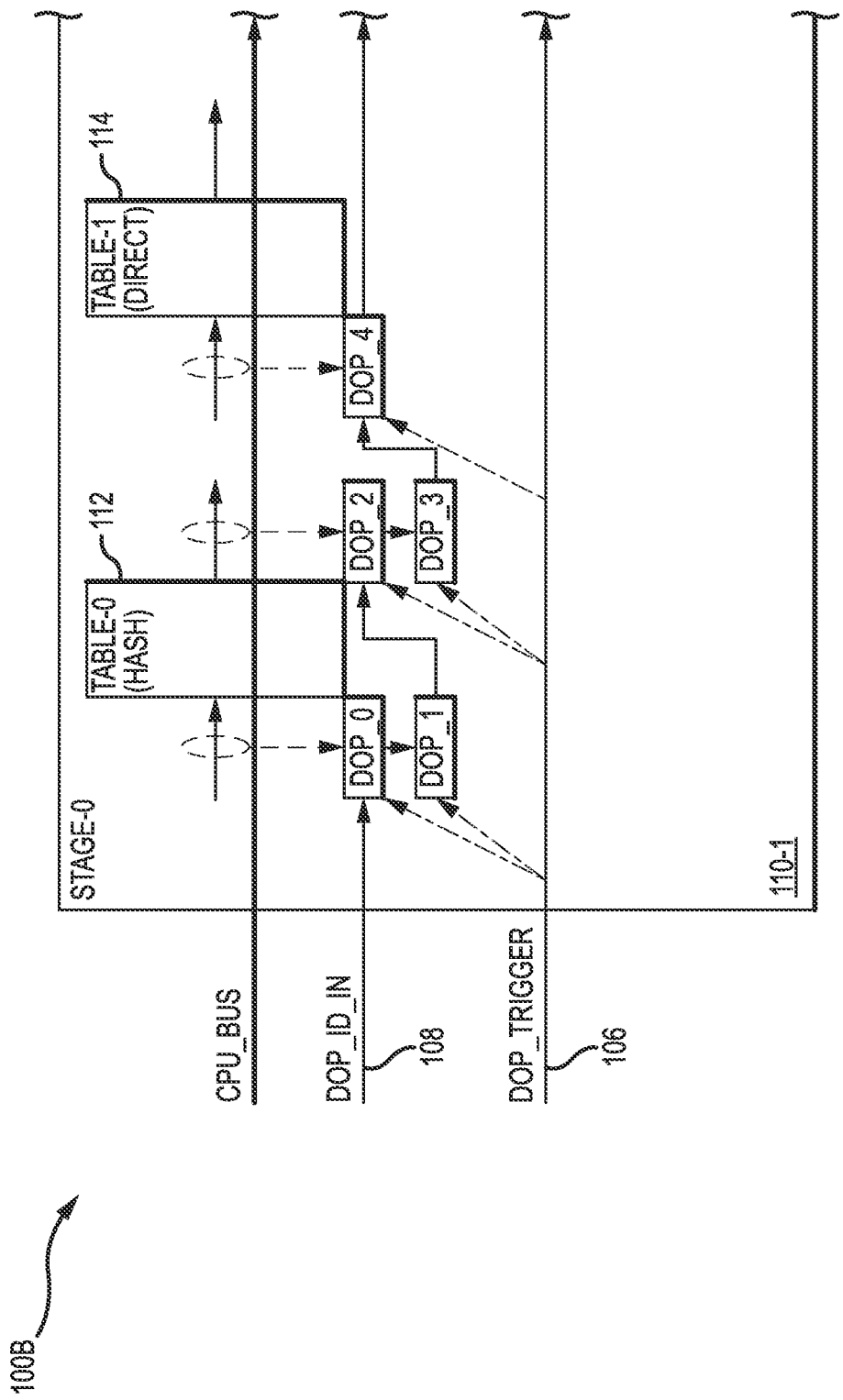
Figure 1C:
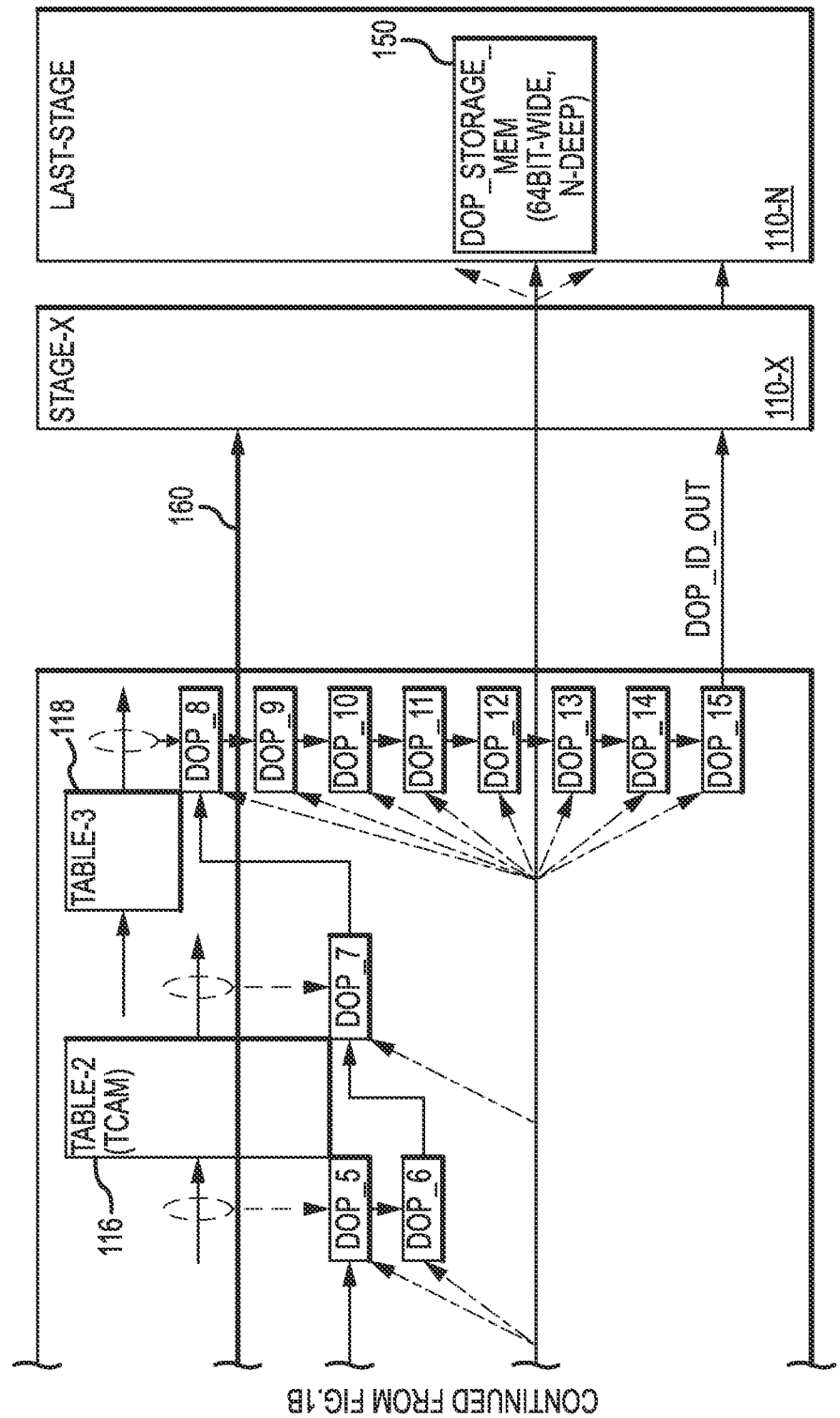

FIGS. 1A through 1C illustrate examples of an apparatus 100A with flexible debug observation-points (DOPs) in accordance with one or more implementations of the subject technology. The apparatus 100A includes a pipeline formed by a number of stages 110 (e.g., 110-1, 110-2 . . . 110-N), a number of DOPs included in the stages 110, and a DOP memory 150. in some implementations, each stage 110 can include one or more DOPs. For example, DOPs A0 through A2 are included in the stage 110-2, and DOPs X0 through X3 are included in a stage 110-x. The DOP memory 150 is provided at an end of the pipeline and in the last stage 110-N, The DOP memory 150 stores data associated with each DOP of the pipeline. The DOP memory 150 can be a deep memory (e.g., 100 bits wide and N bits deep) with sufficient addresses to store data associated with all DOPs of the apparatus 110A.

The DOP memory 150 includes a first-in-first-out (FIFO) storage that makes stored data accessible to software. The DOP memory 150 can in general be M bit wide. For example, if the DOP data is 500 bits and is longer than M (e.g., 100) bits, it can be broken down into multiple (e.g., five) writes into five different locations (e.g., lines) of the DOP memory 150. In some aspects, the length of a DOP data may be less than M and can fill in a portion, for example, half of the bits of a location of the DOP memory 150. The depth of the DOP memory 150 can be chosen based on the number of DOPs, which allows insertion of a desirable number of DOPs. This is an advantageous feature of the subject technology, as the number of DOPs in the existing solutions is limited by the available register address spaces.

The apparatus 100A further includes a DOP collection finite state machine (FSM) 130 (hereinafter FSM 130) and a DOP self-trigger FSM 140. The FSM 130 can perform DOP collection by triggering reading and transferring the data stored in the DOPs 110 to the DOP memory 150. Transferring the data stored in the DOPs 110 to the DOP memory 150 is performed by shifting the data through the DOPs 110 to the DOP memory 150. The FSM 130 sends commands to read each DOP 110 of the pipeline sequentially. In some implementations, the FSM 130 sets a done-bit when data from the DOPs 110 is transferred to the DOP memory 150. The done-bit is detectable by software, and the stored data in the DOP memory 150 is available for access by the software when the done-bit is set.

DOPs are connected to one another as a scan-chain to form a DOP-chain 120. Each DOP includes a flop-based storage that, in some aspects, can be 1-entry deep and have a maximum width of, for example, ~512 bits, Each DOP is identifiable by a unique DOP-identification (ID) associated with that DOP. The DOP IDs are sequential and, for example, can range from DOP_START_ID to a DOP_START_ID to +NUM_DOPS-1, where the NUM_DOPS represents the number of DOPs in the pipeline. For instance if the DOP_START_ID is to 100, for the Nth DOP, the DOP_ID is equal to 100+N−1. In some implementations, the operation of the apparatus 100A may start by a DOP_START_ID 122 that can go through the DOP chain 120 and gets incremented as it reaches the next DOP of the DOP chain 120. In the apparatus 100A, also include the DOP data-collection bus 160 and a DOP self-trigger bus 170. The DOP data-collection bus 160 originates from the FSM 130 and passes through the stages 110 to the DOP memory 150. The DOP self-trigger bus 170 originates from the DOP self-trigger FSM 140 and passes through the stages 110-1 to 110-N.

The apparatus 100B shown in FIGS. 1B and 1C is similar to the apparatus 100A of FIG. 1A, but shows more detail of a typical stage such as the stage 110-1. Other stages 110, such as stage 110-X can have similar structures. Each stage (e.g., stage 110-1), as shown in FIG. 1B, includes logic circuitry, for example, in the form of a number of tables such as a hash table 112, a direct table 114, a ternary content-addressable memory (TCAM) 116, or other tables such as table 118. DOPs are associated with different tables. For example, DOP 0 through DOP 3 are associated with the table 112, DOP 4 is associated with the table 124, DOP 5 through DOP 7 are associated with the table 116, and DOP 8 through DOP 15 are associated with the table 118. Reading of DOP data and transferring (e.g., shifting through DOPs) of the data in DOPs 0 through 15 and DOPs of other stages to the last stage 110-N is triggered by a DOP-trigger signal 106 issued by the FSM 130. The DOP_ID_IN 108 passes through the DOP chain 120 and at each DOP is incremented by one. A trigger signal causes a DOP to latch the data. The stored data in each DOP can be read in response to DOP_READ command addressed to that specific DOP_D. The DOP with that specific DOP_ID, when receives the trigger signal, makes its stored data accessible to the DOP data-collection bus 160 (e.g., CPU-bus) for transferring to the DOP memory 150.

Figure 2A:
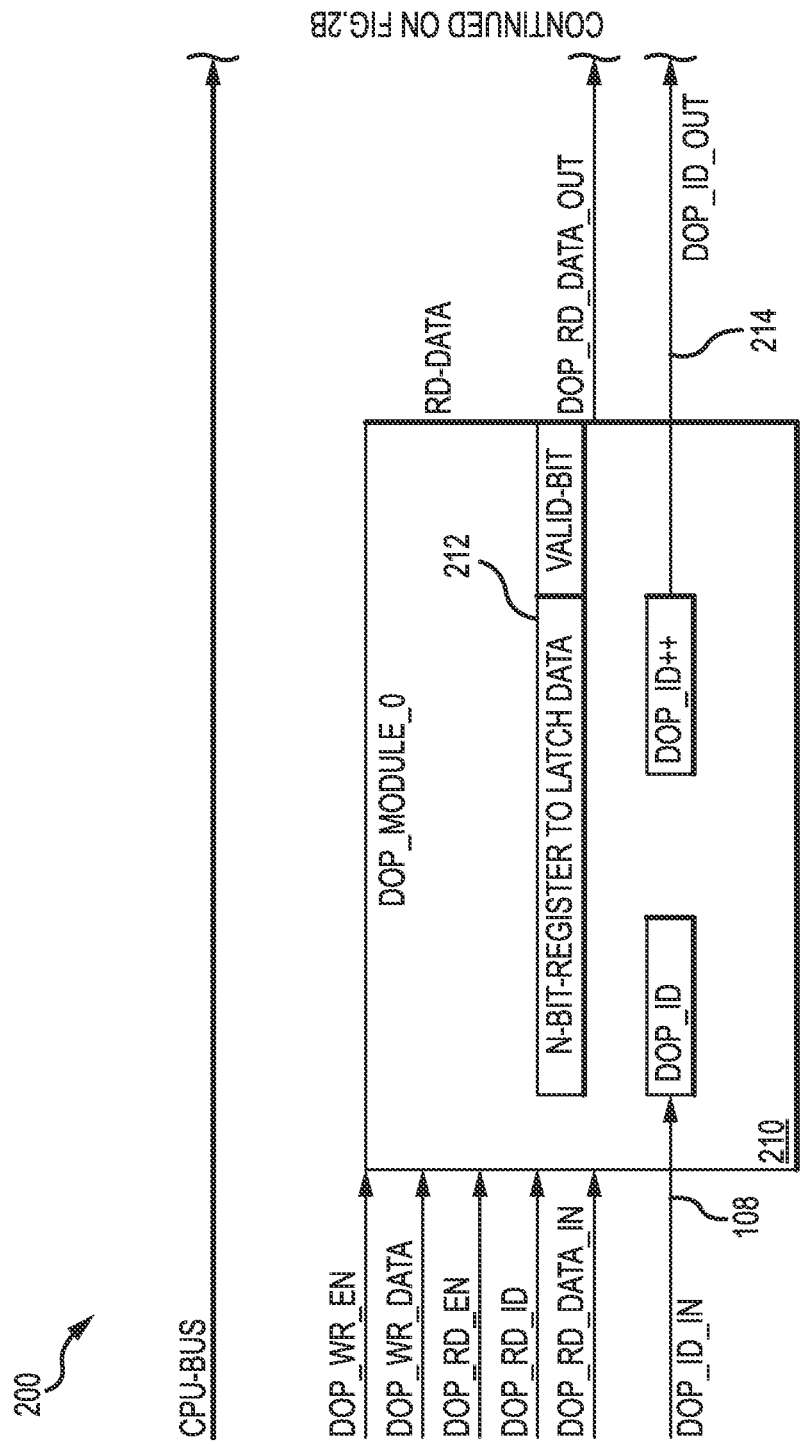
FIGS. 2A-2B illustrate an example of a DOP implementation for the apparatus of FIG. 1A in accordance with one or more implementations.
Figure 2B:
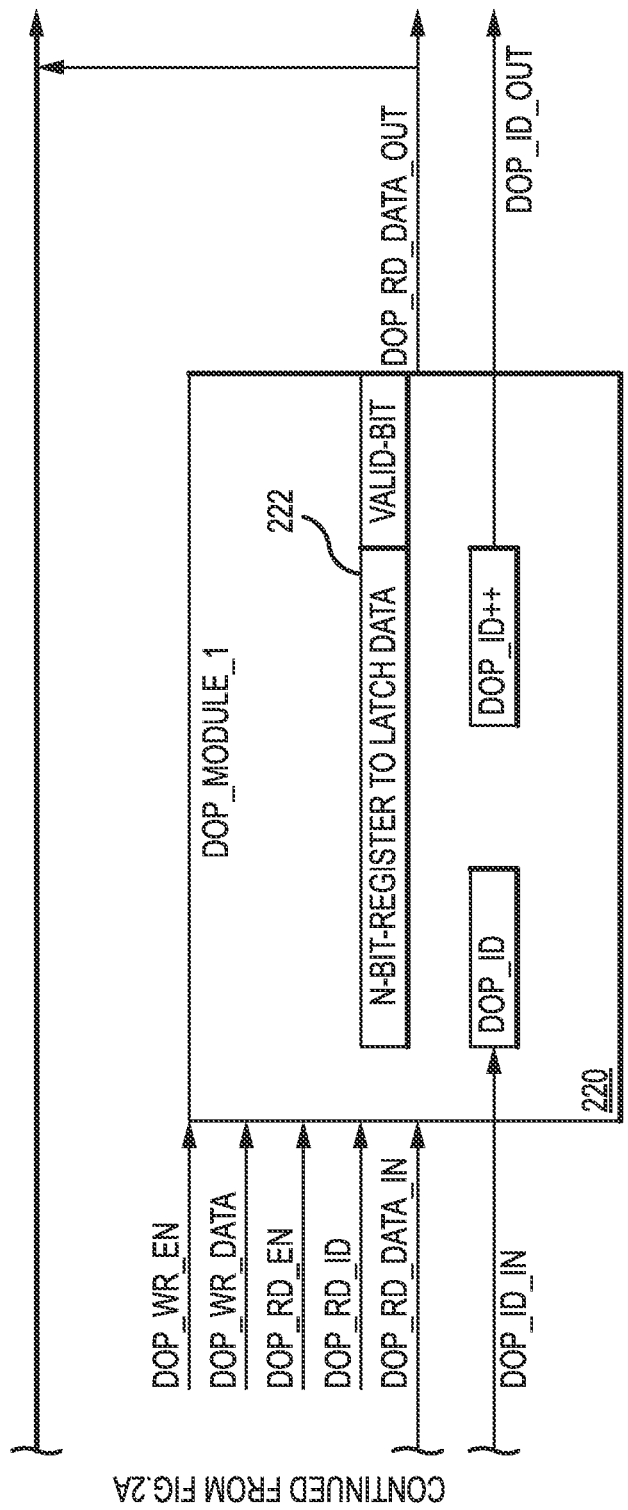

FIGS. 2A-2B illustrate an example of a DOP implementation 200 of the apparatus 100A of FIG. 1A in accordance with one or more implementations of the subject technology. A DOP can be implemented in a number of ways and the DOP implementation 200 is just an example, to which the subject technology is not limited. In some implementations, a DOP of the apparatus 100A can include a DOP module.

For example, the DOP modules 210 and 220 correspond to two successive DOPs (e.g., DOP5 and DOP6 of FIGS. 1B and 1C). The DOP modules 210 and 220 are similar and each includes a register (e.g., register 212 such as an N-bit register) to latch data. As mentioned above, a DOP_ID_IN (e.g., 108) when entered in the DOP module 210 is incremented by one and a DOP_ID_OUT (e.g., 214) is generated, which enters the DOP_ID_IN port of the next DOP module (e.g., 220). The DOP module 210 receives a number of input signals and/or commands DOP_WR_EN, DOP_WR_DATA, DOP_RD_EN, DOPRD_ID, and DOP_RD_DATA_IN. The WR_EN signal is the DOP trigger signal, the DOP_RD_EN is the read trigger that can be caused by an op-code of a command of the DOP data-collection bus 160. The DOP_RD_DATA_IN is the stored data in the DOP register (e.g., 212) that is sent out (e.g., mimed out) as DOP_RD_DATA_OUT onto the DOP data-collection bus 160. The DOP_WR_DATA is the data that is being captured in a stage.

Figure 3A:
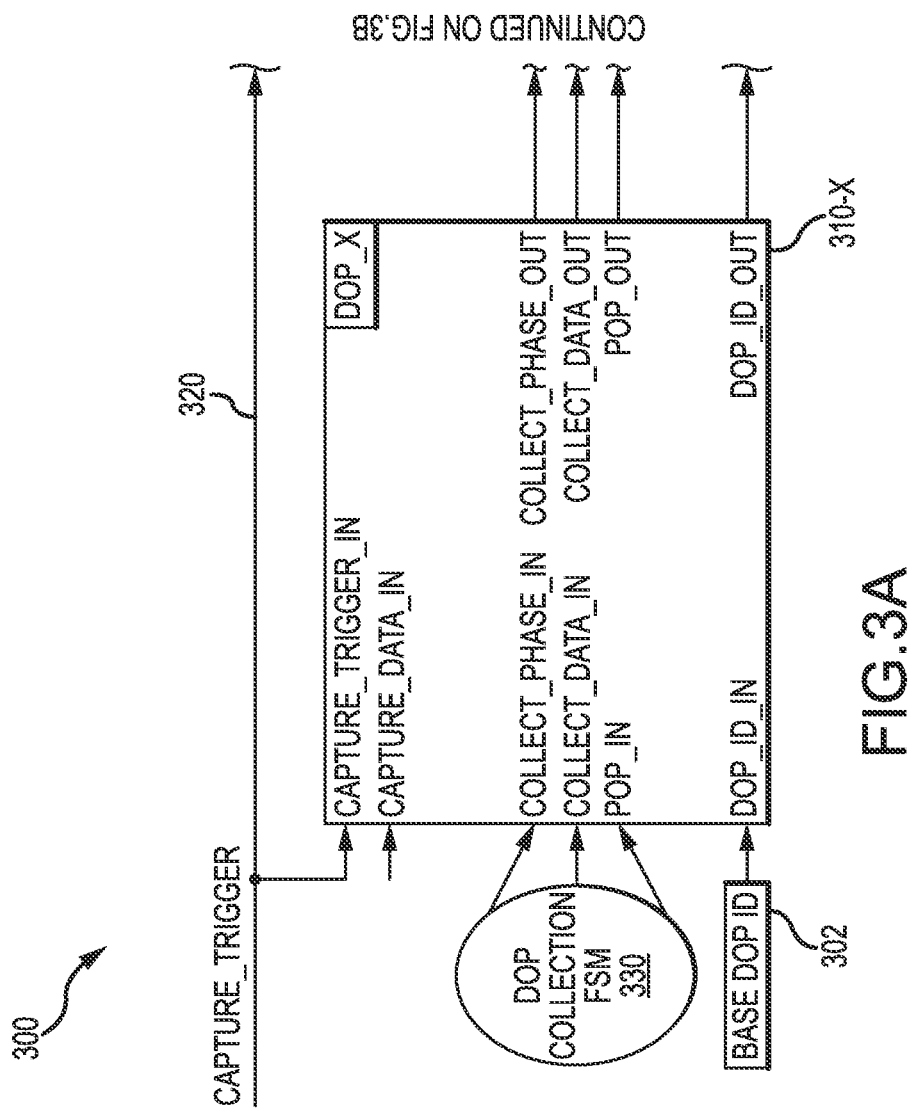
FIGS. 3A-3B illustrate an example of a DOP module chain of the apparatus of FIG. 1A in accordance with one or more implementations.
Figure 3B:
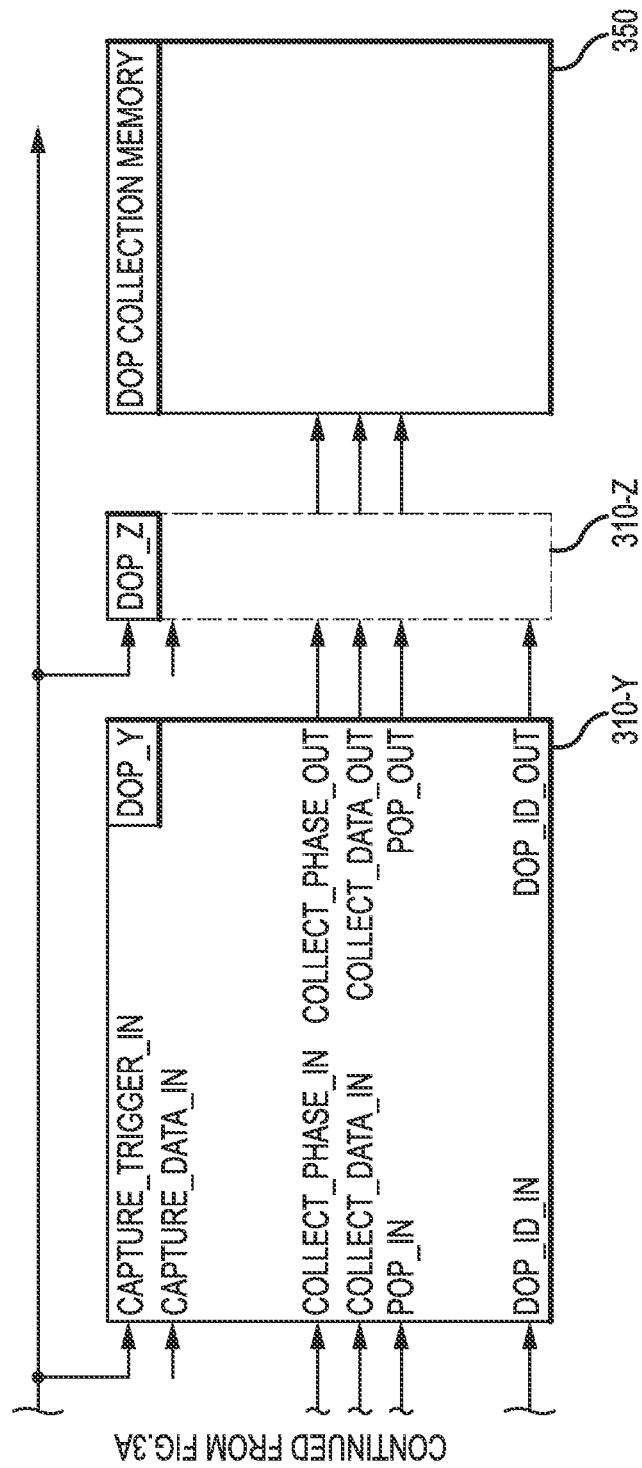

FIGS. 3A-3B illustrate an example of a DOP module chain 300 of the apparatus of FIG. 1A in accordance with one or more implementations of the subject technology. In one or more implementations, the DOP module chain 300 includes a number of DOP modules such as DOP 310-X, DOP 310-Y, DOP 310-Z, and a DOP memory 350. In some implementations, the DOPs the DOP module chain 300 are similar to each other and to the DOPs of FIG. 1A (e.g., DOP 110). In one or more implementations, a capture_trigger_in input of each DOP (e.g., 310-X) is coupled to a CAPTURE-TRIGGER line 320 which enables capturing data at the capture_data_in input of the DOP 310-X. A collect_phase_in, a collect_data_in, and a pop_in input of the DOP 310-X are coupled to and are fed by the DOP collection FSM 330. The DOP_ID_IN input of the DOP 310-X receives a BASE_DOP_ID 302, which is incremented by one and sent out as DOP_ID_OUT as the DOP_ID_IN input of the DOP 310-Y. A collect_phase_out, collect_data_out, and a pop_out output of the DOP 310-X is connected to a collect_phase_in, a collect_data_in, and a pop_in input of the DOP 310-Y and are finally coupled to the DOP memory 350. The data collection takes place according to a strategy explained in more details below.

Figure 4A:
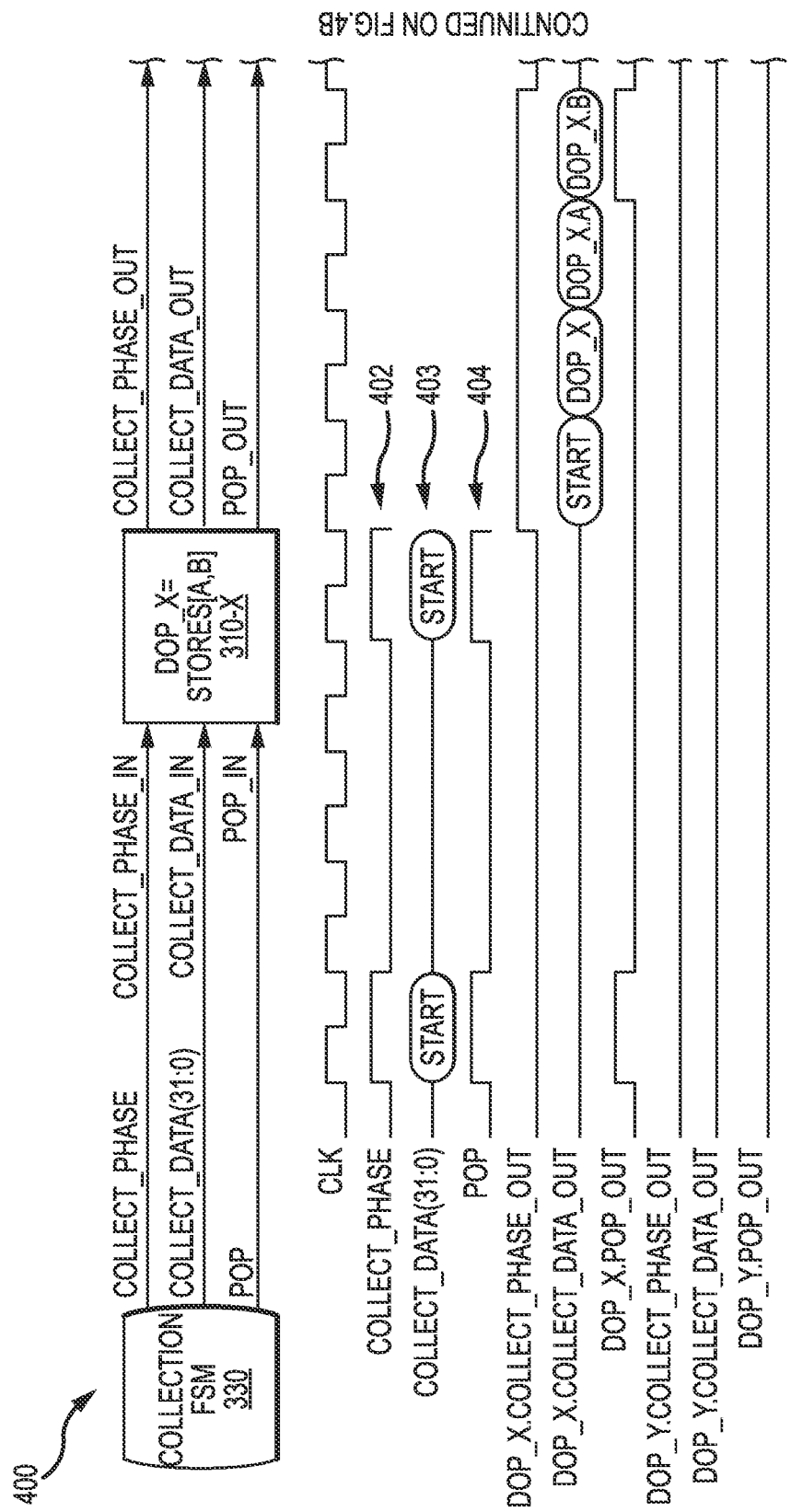
FIGS. 4A-4B illustrate examples of time diagrams associated with a DOP collection strategy in accordance with one or more implementations.
Figure 4B:
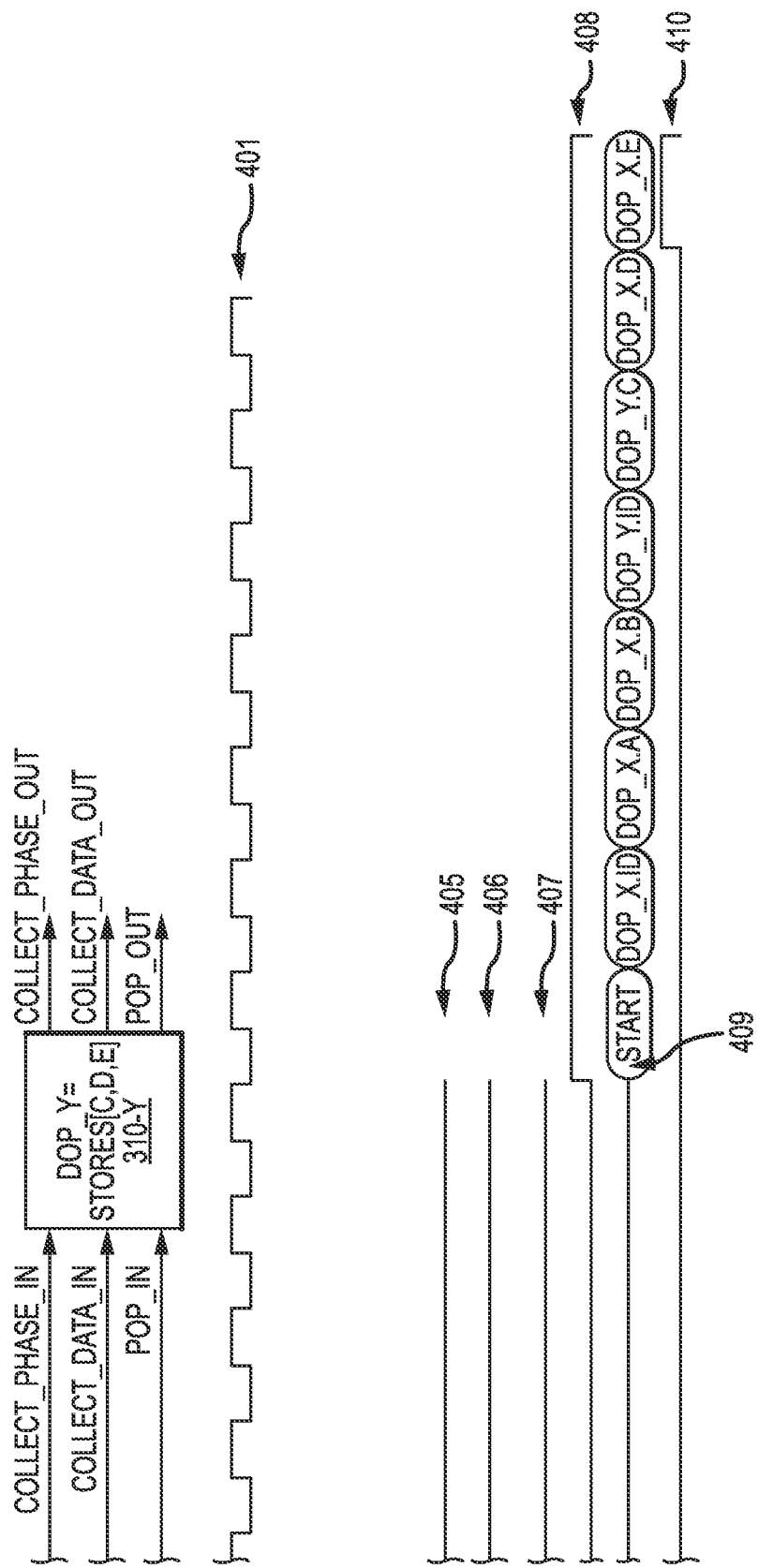

FIGS. 4A-4B illustrate examples of time diagrams associated with a DOP collection strategy 400 in accordance with one or more implementations. The data collection of DOPs such as the DOP 310-X and DOP 310-Y, as explained above, are performed based on the collection strategy 400 described herein with reference to a number of time diagrams 401 through 410. The time diagram 401 shows a series of clock (CLK) pulses based on which the data collection is synchronized. The time diagram 402 is a number of COLLECT_PHASE pulses that are shown to be on for a full period of the CU (pulse and are repeated at a rate that is ¼ of a rate of the CLK pulses, and based of which COLLECT_DATA and POP pulses shown in the time diagram 403 and 404 are generated. The time diagrams 405 and 408 are examples of DOP_COLLEC_PHASE_OUT pulses for the DOP_X (e.g., 310-X) and the DOP_Y (e.g., 310-Y), during which data items A and B (for DOP_X) and data items C, D, and E (for DOP_Y) are stored in the respective DOPs. The time diagrams 407 and 409, respectively, show DOP_POP_OUT pulses for the DOP_X (e.g., 310-X) and DOP_Y (e.g., 310-Y), during which the data has to pop out of DOPs to shift to the next DOP. In some implementations, DOP can be self-triggered, as described in more details below.

Figure 5:
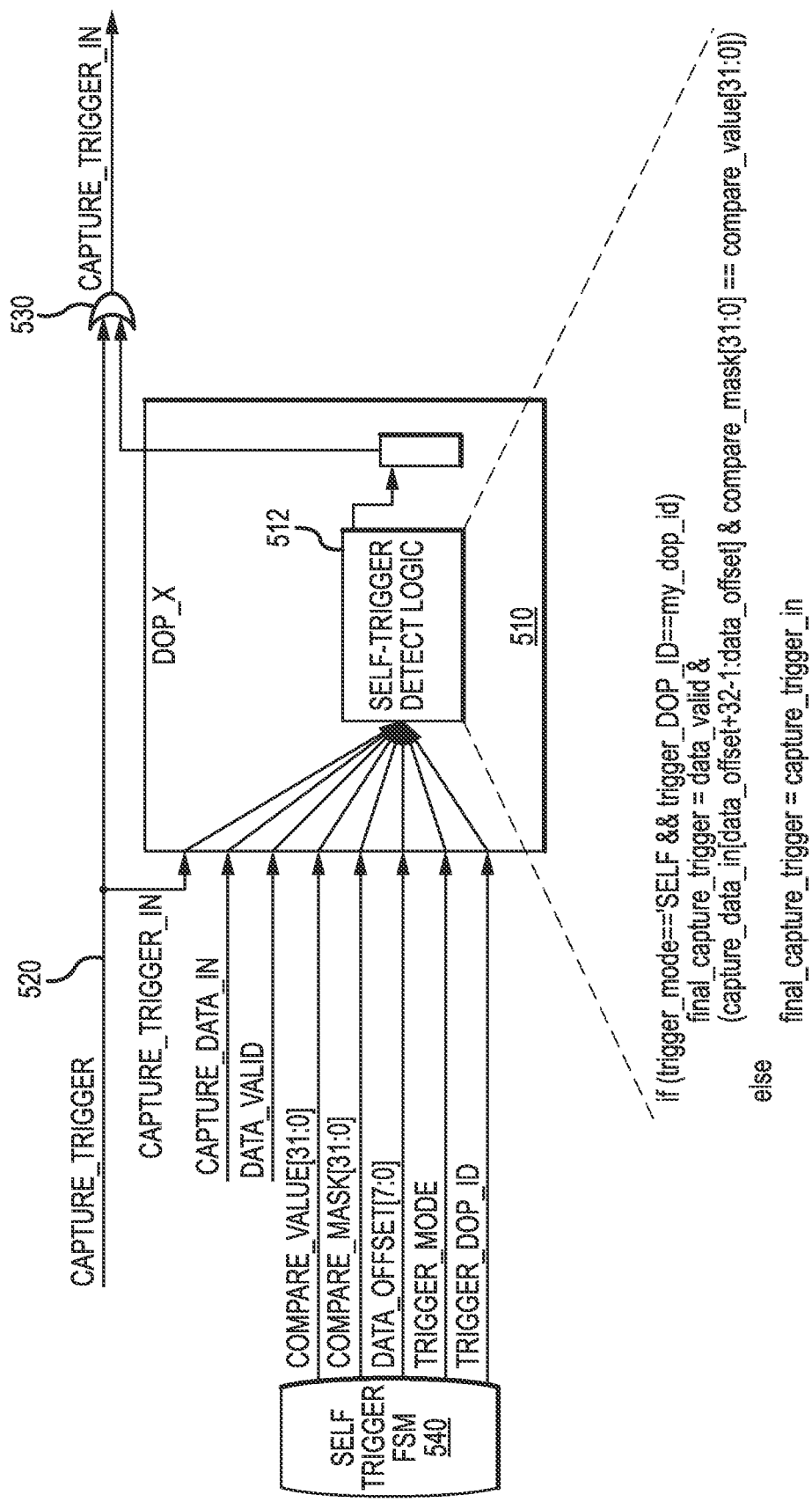
FIG. 5 illustrates an example of a self-trigger mechanism of a DOP of the apparatus of FIG. 1A in accordance with one or more implementations.

FIG. 5 illustrates an example of self-trigger mechanism of a DOP 510 of the apparatus 100A of FIG. 1A in accordance with one or more implementations of the subject technology. A number of DOPs of the DOP chain 120 of FIG. 1A can be self-triggered DOPs. For example, the DOP 510 is a self-triggered DOP and include a self-trigger detect logic circuitry 512. The self-trigger detect logic circuitry 512 can detect an input data matching a predefined criteria and, in response to the detection, can start a self-triggered mode of operation. When the Trigger_DOP_ID generated by the self-trigger FSM 540 matches the DOP_ID of the DOP 510, and the Trigger_mode is set to self-trigger by the self-trigger FSM 540, then the self-trigger detect logic circuitry 512 starts operating by capturing the input data.

In some implementations, each DOP module can be enhanced to set the trigger-signal for all of the downstream DOPs. In one or more implementations, any latched DOP can be used as a trigger, and trigger-generation mechanism can be generalized to remove the need for any specific trigger creation mechanism. An OR gate 530 allows the DOP 510 to function as a trigger for the downstream DOPs instead of the capture-trigger signal 520.

Figure 6:
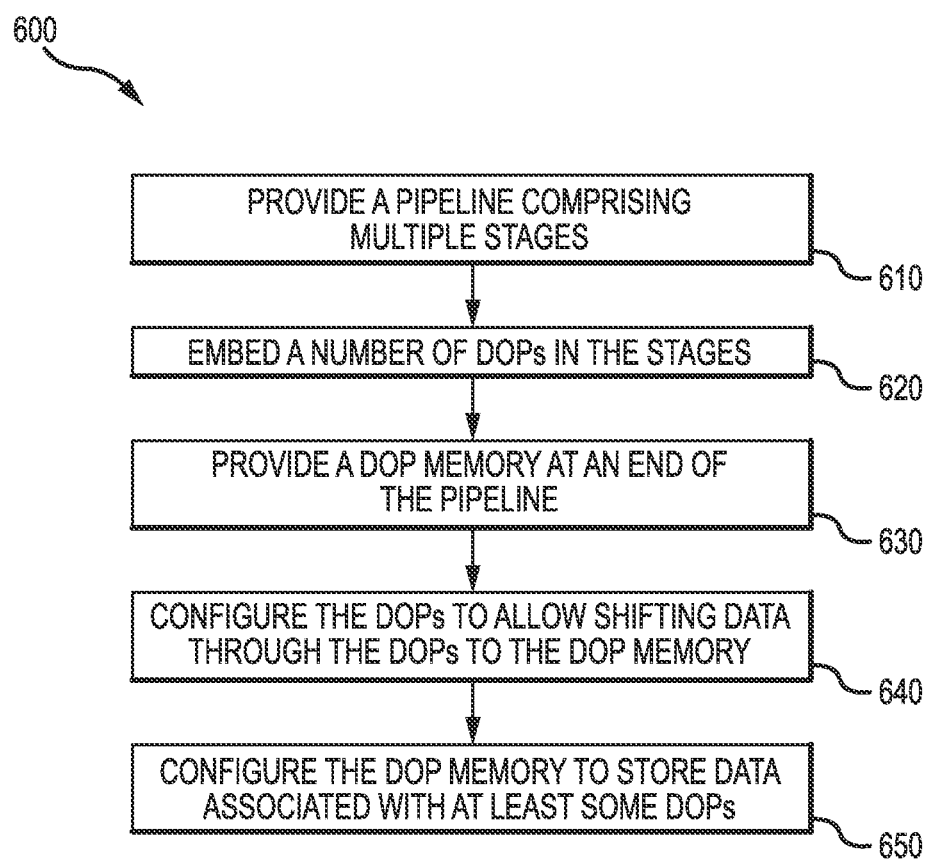
FIG. 6 illustrates an example of a method for insertion of flexible DOPs in a pipeline in accordance with one or more implementations.

FIG. 6 illustrates an example of a method 600 for insertion of flexible DOPs in a pipeline in accordance with one or more implementations of the subject technology. For explanatory purposes, the blocks of the example method 600 are described herein as occurring in serial, or linearly. However, multiple blocks of the example method 600 can occur in parallel. In addition, the blocks of the example method 600 need not be performed in the order shown and/or one or more of the blocks of the example method 600 need not be performed.

According to the method 600, a pipeline including multiple stages (e.g., 110 of FIG. 1A) is provided (610). A number of DOPs (e.g., A0 through A2 of FIG. 1A) are embedded in the stages (620). A DOP memory (e.g., 150 of FIG. 1A) is provided at an end of the pipeline (630). The DOPs allow shifting data through the DOPs to the DOP memory (640). The DOP memory stores data associated with each DOP (650). Each DOP includes a flop-based storage (e.g., 212 of FIG. 2) and is identifiable by a unique DOP-identification (ID) associated with that DOP.

Figure 7:
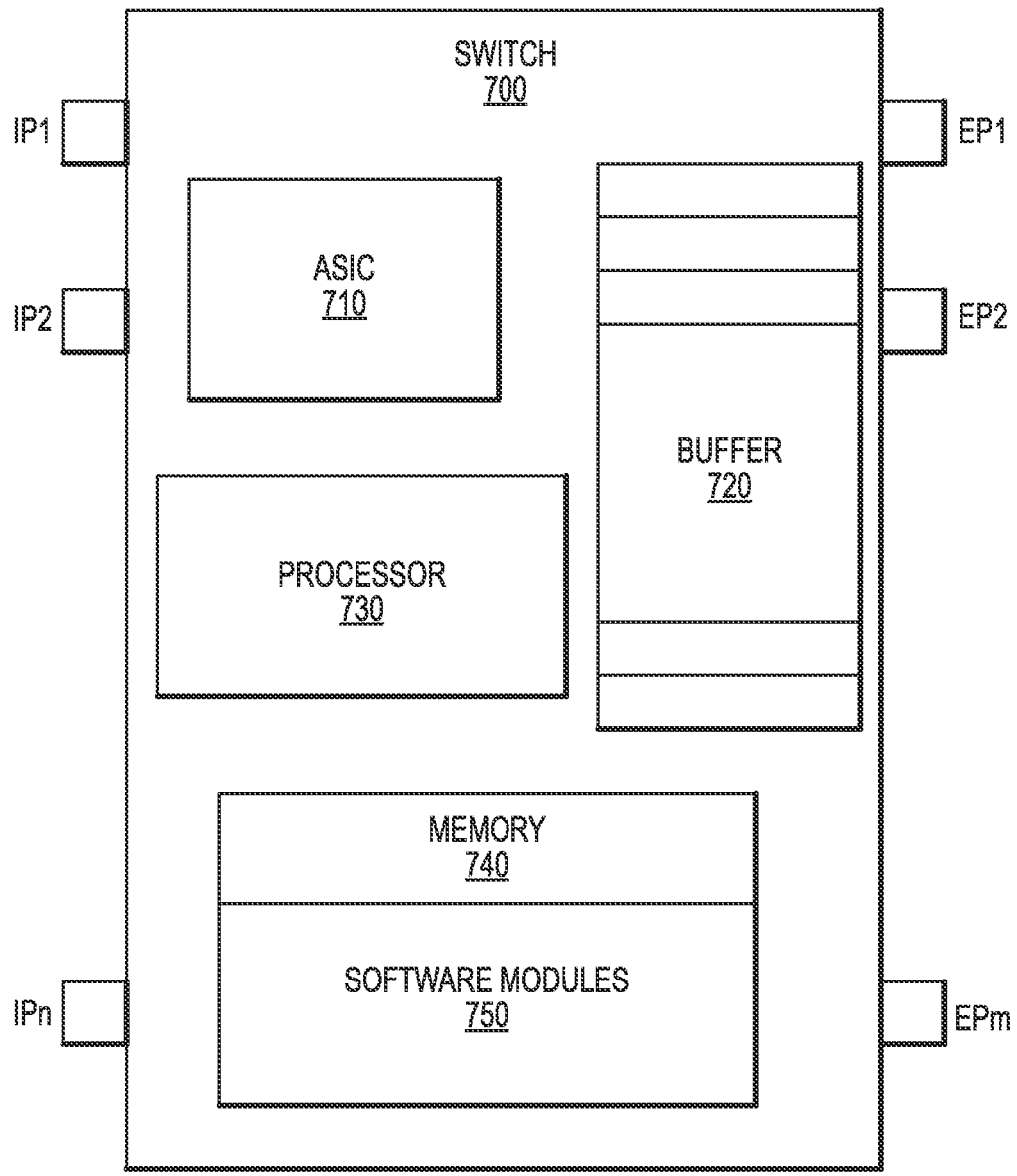
FIG. 7 illustrates an example of a wireless communication device employing features of the subject technology in accordance with one or more implementations.

FIG. 7 illustrates an example of a wireless communication device 700 employing features of the subject technology in accordance with one or more implementations of the subject technology. The communication device 700 leverages features of the subject technology to provide flexible DOPs in various processing pipelines of the device to provide insight into the operation of that pipeline. Examples of the communication device 700 includes art Ethernet switch of an Ethernet network such as a private network including a data-center network, an enterprise network, or other private networks. The communication device 700 includes a number of ingress (input) ports IP1-IPn and multiple egress (output) ports EP1-EPm. In one or more implementations, one or more of the ingress ports IP1-1Pn can receive a data packet from another switch or and endpoint device of the network. The communication device 700 further includes a hardware component such as an application specific integrated circuit (ASIC) 710 (which in some embodiments can be implemented as a field-programmable logic array (FPGA)), a buffer 720, a processor 730, memory 740, and a software module 750.

In some implementations, the ASIC 710 can include suitable logic, circuitry, interfaces and/or code that can be operable to perform functionalities of a PHY circuit. The buffer 720 includes suitable logic, circuitry, code and/or interfaces that are operable to receive and store and/or delay a block of data for communication through one or more of the egress ports EP1-EPm. The processor 730 includes suitable logic, circuitry, and/or code that can enable processing data and/or controlling operations of the communication device 700. In this regard, the processor 730 can be enabled to provide control signals to various other portions of the communication device 700. The processor 730 also controls transfers of data between various portions of the communication device 700. Additionally, the processor 730 can enable implementation of an operating system or otherwise execute code to manage operations of the communication device 700.

The memory 740 includes suitable logic, circuitry, and/or code that can enable storage of various types of information such as received data, generated data, code, and/or configuration information. The memory 740 includes, for example, RAM, ROM, flash, and/or magnetic storage. In various embodiment of the subject technology, the memory 740 may include a RAM, DRAM, SRAM, T-RAM, Z-RAM, TTRAM, or any other storage media. The memory 740 can include software modules 750 that when executed by a processor (e.g., processor 730) can perform some or all of the functionalities of the ASIC 710. In some implementations, the software modules 750 include codes that when executed by a processor can perform functionalities such as configuration of the communication device 700.

Those of skill in the art would appreciate that the various illustrative blocks, modules, elements, components, and methods described herein can be implemented as electronic hardware, computer software, or combinations of both. To illustrate this interchangeability of hardware and software, various illustrative blocks, modules, elements, components, and methods have been described above generally in terms of their functionality. Whether such functionality is implemented as hardware or software depends upon the particular application and design constraints imposed on the overall system. Skilled artisans can implement the described functionality in varying ways for each particular application. Various components and blocks can be arranged differently (e.g., arranged in a different order, or partitioned in a different way) all without departing from the scope of the subject technology.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

A phrase such as "an aspect" does not imply that such aspect is essential to the subject technology or that such aspect applies to all configurations of the subject technology. A disclosure relating to an aspect can apply to all configurations, or one or more configurations. An aspect can provide one or more examples of the disclosure. A phrase such as an "aspect" refers to one or more aspects and vice versa. A phrase such as an "embodiment" does not imply that such embodiment is essential to the subject technology or that such embodiment applies to all configurations of the subject technology. A disclosure relating to an embodiment can apply to all embodiments, or one or more embodiments. An embodiment can provide one or more examples of the disclosure. A phrase such an "embodiment" can refer to one or more embodiments and vice versa. A phrase such as a "configuration" does not imply that such configuration is essential to the subject technology or that such configuration applies to all configurations of the subject technology. A disclosure relating to a configuration can apply to all configurations, or one or more configurations. A configuration can provide one or more examples of the disclosure. A phrase such as a "configuration" can refer to one or more configurations and vice versa.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein can be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. An apparatus with flexible debug observation-points (DOPs), the apparatus comprising:
   a pipeline comprising a plurality of stages;
   a plurality of DOPs embedded in the plurality of stages;
   a DOP memory provided at an end of the pipeline, wherein the plurality of DOPs are configured to allow shifting data through the plurality of DOPs to the DOP memory; and
   a finite state machine (FSM) configured to perform DOP collection by triggering reading and transferring data stored in the plurality of DOPs to the DOP memory, wherein transferring the data comprises shifting the data through the plurality of DOPs to the DOP memory, wherein the FSM is further configured to set a done-bit when the data from the plurality of DOPs has been transferred to the DOP memory, wherein the done-bit is detectable by software and the transferred data is accessible by the software when the done-bit is set, and
   wherein a DOP of the plurality DOPs comprises a flop-based storage and is identifiable by a unique DOP-identification (ID) associated with the DOP of the plurality DOPs.

2. The apparatus of claim 1, wherein a stage of plurality of stages includes one or more embedded DOPs.

3. The apparatus of claim 1, wherein the DOP of the plurality of DOPs is configured to latch data in response to the triggering the by the FSM and the latched data is readable by using a processor command, wherein the processor command is addressable to a DOP-ID associated with a DOP of the plurality DOPs that is enabled to respond to the processor command by making the latched data accessible to a processor bus.

4. The apparatus of claim 1, wherein the DOP memory comprises a first-in-first-out (FIFO), wherein the FIFO is configured to make the stored data associated with the DOP of the plurality DOPs accessible to software.

5. The apparatus of claim 1, wherein the FSM is further configured to send commands to read at least some DOPs of the plurality of DOPs sequentially.

6. The apparatus of claim 1, wherein a stage of the plurality of stages comprises at least one of a logic circuitry, a hash table, a direct table, or a ternary content-addressable memory (TCAM).

7. The apparatus of claim 1, wherein the DOP of the plurality DOPs includes self-trigger detect logic circuitry, wherein the self-trigger detect logic circuitry is configured to detect an input data matching a predefined criteria and, in response to detecting the input data matching the predefined criteria, to start a self-triggered mode of operation.

8. The apparatus of claim 7, wherein a respective DOP is configured to capture, in the self-triggered mode of operation, the input data and to create a trigger for downstream DOPS.

9. A method for insertion of flexible debug observation-points (DOPs), the method comprising:
   providing a pipeline comprising a plurality of stages;
   embedding a plurality DOPs in the plurality of stages;
   providing a DOP memory at an end of the pipeline, wherein the plurality of DOPs are configured to allow shifting of data through the plurality of DOPs to the DOP memory;
   configuring a finite state machine (FSM) to perform DOP collection by triggering reading and transferring data stored in the plurality of DOPs to the DOP memory wherein transferring the data comprises shifting the data through the plurality of DOPs to the DOP memory; and
   configuring the FSM to set a done-bit when the data from the plurality of DOPs has been transferred to the DOP memory,
   wherein the done-bit is detectable by software and the transferred data is accessible by the software when the done-bit is set, and
   wherein the DOP of the plurality DOPs comprises a flop-based storage and is identifiable by a unique DOP-identification (ID) associated with that DOP.

10. The method of claim 9, wherein embedding the plurality DOPs in the plurality of stages comprise embedding one or more DOPs of the plurality DOPs in a stage of plurality of stages.

11. The method of claim 9, wherein the DOP of the plurality of DOPs is configured to latch data in response to the triggering by the FSM, wherein the latched data is configured to be readable by a processor command, wherein the processor command is addressable to a DOP-ID associated with a DOP of the plurality of DOPs that is enabled to respond to the processor command by making the latched data accessible to a processor bus.

12. The method of claim 9, wherein providing the DOP memory comprises providing a first-in-first-out (FIFO), and the method comprises configuring the FIFO to make stored data accessible to software.

13. The method of claim 9, further comprising configuring the FSM to: send commands to read at least some DOPs of the plurality of DOPs sequentially.

14. The method of claim 9, wherein a stage of the plurality of stages comprises at least one of a logic circuitry, a hash table, a direct table, or a ternary content-addressable memory (TCAM).

15. The method of claim 9, wherein the DOP of the plurality DOPs include self-trigger detect logic circuitry, wherein the method further comprises:
 configuring the self-trigger detect logic circuitry to detect an input data matching a predefined criteria; and
 in response to detecting the input data matching the predefined criteria, and starting a self-triggered mode of operation.

16. The method of claim 15, further comprising a respective DOP to capture, in the self-triggered mode of operation, the input data and to create a trigger for downstream DOPS.

17. A communication system comprising:
 a switch configured to receive input data at one or more input ports and to transmit output data from one or more output ports;
 a pipeline comprising a plurality of stages configured to process the input data and to provide the output data;
 a plurality of DOPs embedded in the plurality of stages;
 a DOP memory provided at an end of the pipeline, wherein the plurality of DOPs are configured to allow shifting data through the plurality of DOPs to the DOP memory; and
 a finite state machine (FSM) configured to perform DOP collection by triggering reading and transferring data stored in the plurality of DOPs to the DOP memory, wherein transferring the data comprises shifting the data through the plurality of DOPs to the DOP memory,
 wherein the FSM is further configured to set a done-bit when the data from the plurality of DOPs has been transferred to the DOP memory,
 wherein the done-bit is detectable by software and the transferred data is accessible by the software when the done-bit is set, and
 wherein the DOP of the plurality DOPs comprises a flop-based storage and is identifiable by a unique DOP-identification (ID) associated with that DOP.

18. The system of claim 17, wherein:
 a stage of plurality of stages includes one or more embedded DOPs,
 at least one DOP of the plurality of DOPs is configured to latch data in response to the triggering by the FSM,
 the latched data is readable by using a processor command, and
 the processor command is addressable to a DOP-ID associated with a DOP of the plurality DOPs that is enabled to respond to the processor command by making the latched data accessible to a processor bus.

* * * * *